(12) United States Patent
Ploss et al.

(10) Patent No.: US 7,105,136 B2
(45) Date of Patent: Sep. 12, 2006

(54) CONTROLLED MORPHOGENESIS OF COPPER SALTS

(75) Inventors: Hartmut Ploss, Hamburg (DE); Gerhard Goebel, Itzehoe (DE); André Simon, Hamburg (DE)

(73) Assignee: Spiess-Urania Chemicals GmbH, Hamburg (DE)

( * ) Notice: Subject to any disclaimer, the term of this patent is extended or adjusted under 35 U.S.C. 154(b) by 671 days.

(21) Appl. No.: 10/256,186

(22) Filed: Sep. 27, 2002

(65) Prior Publication Data

US 2003/0077219 A1   Apr. 24, 2003

(30) Foreign Application Priority Data

Sep. 28, 2001 (DE) .................. 101 48 145
Oct. 16, 2001 (DE) .................. 101 51 060

(51) Int. Cl.
*C01G 3/00* (2006.01)
(52) U.S. Cl. ............ 423/23; 423/395; 423/419.1; 423/472; 423/557; 423/604
(58) Field of Classification Search .......... 423/23, 423/604, 395, 472, 419.1, 557
See application file for complete search history.

(56) References Cited

U.S. PATENT DOCUMENTS 5,238,671 A * 8/1993 Matson et al. .............. 423/397
6,413,489 B1 * 7/2002 Ying et al. .................. 423/600
6,752,979 B1 * 6/2004 Talbot et al. ............. 423/592.1
2003/0051580 A1 * 3/2003 Lewis et al. ................... 75/362
2004/0009117 A1 * 1/2004 Lewis et al. ................. 423/493

FOREIGN PATENT DOCUMENTS

DE    41 27 852 A1   2/1993
EP    395 243 A2    10/1990
EP    839 759 A2     5/1998

OTHER PUBLICATIONS

Katharina Landfester et al.: "Preparation of Polymer Particles in Nonaqueous Direct and Inverse Miniemulsions", vol. 33, No. 7 pp. 2370-2376, 2000, no month.

* cited by examiner

*Primary Examiner*—Steven Bos
(74) *Attorney, Agent, or Firm*—Harness, Dickey & Pierce, P.L.C.

(57) ABSTRACT

In a method for preparing copper salts from at least one cupriferous and one additional reactant, the reactants are used to prepare micro-emulsions while employing at least one block polymer, the intermediate products obtained this way are mixed and reacted together so as to form a micro-emulsion. The preparation of the starting micro-emulsion as well as the subsequent joint reaction preferably occur either with ultrasound or in a high-pressure homogenizer. The copper salts obtained this way exhibit a particle size of less than 50 nm, preferably 5 to 20 nm and can be adjusted to specific applications through the appropriate doping of foreign ions.

11 Claims, No Drawings

CONTROLLED MORPHOGENESIS OF COPPER SALTS

The present application hereby claims priority under 35 U.S.C. § 119 to German Patent Application No. 10148145.4, filed Sep. 28, 2001, and German Patent Application No. 10151060.8, filed Oct. 16, 2001, the entire contents of both applications which are hereby incorporated by reference.

FIELD OF THE INVENTION

The invention relates to a method for producing copper salts from at least one cupriferous and one additional reactant. Furthermore, it relates to a copper salt that has been produced pursuant to this method.

BACKGROUND OF THE INVENTION

The production of crystalline copper salts, such as for example copper hydroxide ($Cu(OH)_2$), copper-(I)-oxide ($Cu_2O$), copper-(II)-oxide ($CuO$), alkaline copper carbonate ($CuCO_3 \times Cu(OH)_2 \times H_2O$) or alkaline copper nitrate ($Cu(NO_3)_2 \times 3Cu(OH)_2 \times 2H_2O$) as well as mixed salts, such as for example copper oxychloride ($CuCl_2 \times 3Cu(OH)_3$) and alkaline copper sulfate ($CuSO_4 \times 3Cu(OH)_2$) generally occurs either through the oxidative leaching or metallic copper or through a stoichiometric chemical reaction of soluble copper salts with the appropriate base (preferably a strong base such as lye) and/or through consecutive reactions of the created finely dispersed substances.

One example for oxidative leaching is the preparation of copper oxychloride pursuant to the reaction:

$$4Cu + 2CuCl_2 + 2HCl + \tfrac{1}{2}O_2 \rightarrow 6CuCl + H_2O \quad (1)$$

$$6CuCl + 1\tfrac{1}{2}O_2 + 3H_2O \rightarrow 3Cu(OH)_2 \times CuCl_2 + 2CuCl_2 \quad (2)$$

Examples of chemical reactions of soluble copper salts are the production of copper hydroxide pursuant to the three methods below:

Copper Hydroxide Method I $$CuSO_4 + Na_2PO_4 \rightarrow CuNaPO_4 + Na_2SO_4 \quad (3)$$

$$CuNaPO_4 + 2NaOH \rightarrow Cu(OH)_2 + Na_3PO_4 \quad (4)$$

or

Copper Hydroxide Method II $$3Cu(OH)_2 \times CuCl_2 + 2NaOH \rightarrow 4Cu(OH)_2 + 2NaCl \quad (5)$$

or

Copper Hydroxide Method III $$3Cu + 1\tfrac{1}{2}O_2 + 3H_2O \rightarrow 3Cu(OH)_2 \quad (6)$$

Further examples include the production of alkaline copper carbonate pursuant to the reaction:

$$2Cu(OH)_2 + CO_2 \rightarrow CuCO_3 \times Cu(OH)_2 \times H_2O, \quad (7)$$

of alkaline copper nitrate pursuant to the reaction:

$$4Cu(OH)_2 + 2HNO_3 \rightarrow Cu(NO_3)_3 \times 3Cu(OH)_2 \times 2H_2O \quad (8)$$

and the so-called Bordeaux mixture pursuant to one of the following reactions:

$$CuSO_4 + Ca(OH)_2 + 4CuOxSO_3 \times 3H_2O \times 3CaSO_4 \quad (9)$$

(in the case of excess $CuSO_4$)

$$CuSO_4 + Ca(OH)_2 \rightarrow [Ca(OH)_2]_3 CuSO_4 \quad (10)$$

(in the case of excess $Ca(OH)_2$)

The copper salts generated in these reactions usually have a particle size between about 1 and about 10 micrometers (µm) and a particle surface area of about 1 to about 10 m²/g. The structure of the crystalline material produced will depend upon the chemical composition and, to a certain degree, upon the production method utilized. For example, copper hydroxide crystals produced according to the of the copper hydroxide produced pursuant to Method II are generally available in a needle shape, while the crystals of the copper oxychloride produced through oxidative leaching pursuant described above are generally available in an octahedron shape.

The biologically active portion of such copper compounds is the copper ion, which can be released from these water-insoluble salts and which is available through a natural, so-called slow-release process for the medium that is to be protected, e.g., plants, wood or water. In the case of fungicidal and bactericidal applications of such compounds to plants, the respective copper salt compound is typically sprayed onto the plant's leaf surface to form a copper salt particle film substantially covering the leaf surface.

By reducing the particle size of the copper salt particles, it is possible to reduce the quantity of copper salt that has to be applied per leaf surface while at least maintaining the same effect. One way to achieve this result is by controlling the production conditions, especially the temperatures and concentrations of the involved substances. This way the particle size can be lowered from 50 to about 10 µm, possibly to about 1 to 3 µm. It is thus possible to increase the effectiveness towards special types of fungi from the existing 80% to 100% or to main an existing 100% effectiveness towards special fungi while simultaneously reducing the copper salt dosage rate that is required per hectare.

SUMMARY OF THE INVENTION

The present invention provides a method for further reducing the particle size and/or increasing the effective surface area of copper salt particles, thereby permitting further reductions in the quantity of copper salt required to maintain or improve the same beneficial effects achieved with prior art versions of the same copper salt. Furthermore it is the object of the invention to provide a range of copper salts having improved properties for use in a wide range of applications.

The invention resolves the first task through a method, where micro-emulsions are prepared from two reactants while employing at least one block polymer to obtain intermediate products. These intermediate products are, in turn, mixed with each other and reacted together so as to form a final micro-emulsion comprising the desired copper salt. The production of the starting micro-emulsions as well as the combination and subsequent reaction is preferably conducted under the influence of ultrasound or in a high-pressure homogenizer. The copper salts produced according to the present invention are characterized by primary particles having an average size of less than 50 nm, and preferably between 5 and 20 nm.

DETAILED DESCRIPTION OF THE PREFERRED EMBODIMENTS

The method according to the present invention may utilizes a variety of techniques for the production of the micro-emulsions. Certain of these techniques are already widely employed in the production of polymer particles and are described in the relevant literature including, for example, by K. Landfester, M. Willert and M. Antonietti, "Preparation of Polymer Particles in Nonaqueous Direct and Inverse Miniemulsions," *Macromolecules*, Volume 33, 2000, pp. 2370–76. The method according to the present invention also involves synthetic block polymers and their chemical reaction in the form of nano-reactors. Intermediate micro-emulsions are prepared from the reactants, preferably with ultrasonic agitation or in a high-pressure homogenizer, while employing a block copolymer. These intermediate micro-emulsions are, in turn, are mixed together and subsequently reacted, again preferably under the influence of ultrasonic agitation or in a high-pressure homogenizer, whereby each micelle acts as an independent nano-reactor.

In this example the invention takes advantage of the above-described influence of the particle size on the product properties by making copper salts with particle sizes in the nanometer range available. In the range of these particle sizes, characteristic function/property relations are formed both in living and non-living systems. This size range also corresponds to certain of the property-determining organizational units of biological systems.

The copper salts pursuant to the invention can be produced in two ways: either through the reaction of soluble salts, for example $CuCl_2$ or $Cu(NO)_3$, with bases, preferably strong bases, and, most preferably, lyes, for generating an alkaline copper compound, wherein the educts exist as solutions, or through the use of dispersed agglomerates as an intermediate product, for example through the reaction of, for example, a solid $Cu(OH)_2$/NaCl agglomerate, obtained through the micro-emulsion process according to the present invention, to produce $Cu_2O$ in a multi-phase reaction that reduces $Cu^{2+}$ to $Cu^+$.

In the method pursuant to the invention, insoluble copper compounds comprising the desired composition are created in each nano-reactor. This type of reaction provides a considerable advantage of the present invention by making the required quantity of stabilizing block polymers extremely low. With comparatively small additive quantities, both minute copper salt particles and high conversion rates can be achieved. Water-soluble salts, e.g., sodium chloride or sodium sulfate, may be used in the micro-emulsion technique and created during the special chemical reaction fill in the spaces between drop-shaped agglomerating formations. The quantity of salt required to obtain this effect depends on the respective process. Agglomerates characterized by a size of about 200 nanometers (nm) consist of a multitude of primary particles characterized by a size range of 5 to 20 nm. Due to their composition, these agglomerates decompose after application to render effective the primary particles at the desired application location.

Due to their nanometer range particle size, the water-insoluble copper salts produced pursuant to the present invention exhibit surprising new properties, which differ considerably from the corresponding prior art embodiments of these water-insoluble copper salts whose particle size is in the micrometer range. Due to these novel properties, new and improved applications possibilities arise, as do considerable advantages in a wider field of endeavors, some of which are discussed below.

In the area of fungicidal and biocide applications, the biological activity of compositions according to the present invention, in relation to the application rate required per hectare, is increased to such an extent that a significant reduction in the quantity of copper salt applied is possible.

By applying the copper salts at significantly lower rates, the release of copper into the environment can be brought closer to the actual copper consumption of the plants, thereby significantly reducing environmental pollution concerns.

In the area of wood treatment applications, copper compounds that have been produced pursuant to the present invention can penetrate more easily and more deeply into the wood layers under treatment due to their quasi atomic size. These improved properties can eliminate or reduce the need for pressure impregnation while ensuring prolonged protection against various organisms.

In other technical applications, the significant increase of the specific area of the particles produced according to the present invention, increasing the specific area from typical prior art values of from 1 to 10 $m^2/g$ to about 400 $m^2/g$, results in copper compounds with completely new properties such as catalytic activity increases measured in orders of magnitude.

Finally, in the area of anti-fouling (marine) paints, the use of copper-(I)-oxide particles having typical sizes in the nanometer range enables the production of anti-fouling paints having specific and reduced emission behavior of copper ions. Such paints are considerably more environmentally friendly than the existing anti-fouling paints.

Beyond that, the step provided pursuant to the invention for producing micro-emulsions enables specific doping of the generated nano-particles with foreign ions. While in conventional chemical reactions the conversion of each anion or cation represents its own chemical reaction, which triggers a fractioned product creation and thus a separation of the individual salts, the method pursuant to the invention results in substantially even doping. This makes it possible to adjust secondary properties specifically through the selection and quantity of foreign ions doped into copper salts according to the present invention. Although this technique may be conducted with essentially any anionic or cationic species, zinc, phosphate and carbonate ions are preferred.

The formulation of the invented copper compounds in the nanometer range occurs in the familiar fashion based on the application purpose.

The invention is explained in more detail in the following example.

EXAMPLE 50 g of a $CuCl_2$ solution is emulsified with 1 g to 10 g, preferably 4 g, of a polyethyleneoxide block polymer and an organic solvent, such as 2,2,4-trimethylpentane, the emulsification preferably occurring under ultrasound treatment or through high-pressure homogenization, to form a first micro-emulsion.

In addition to the 2,2,4-trimethylpentane used, cyclohexane, rape-seed oil and isopropyl palmitate have been found suitable as organic solvents.

The duration of the micro-emulsion preparation is regulated with turbidimetric methods. In the case of alkaline ingredients, a specifically scheduled process is preferred to suppress hydrolysis of the fats. For this example, a reaction time of about 120 seconds was found to be sufficient.

Furthermore, 17.5 g of sodium hydroxide was dissolved in 29 ml water and separately micro-emulsified with the block polymer and solvent system used for the $CuCl_2$ solution as described above to form a second micro-emulsion, again preferably under ultrasound treatment or high-pressure homogenization.

The first and second micro-emulsions were then combined, mixed and chemically converted through renewed ultrasound treatment or high-pressure homogenization.

The product obtained this way is monodisperse and stable. In this composition it can be formulated directly into a liquid end product without further processing. For the preparation of a dry formulation, the micro-emulsion obtained this way is dried, wherein this process preferably occurs under vacuum conditions.

The product produced according to the above Example was then examined using X-ray diffractometry and scanning electron microscopy to confirm particle sizes between 10 and 50 nm (nm) and agglomerate sizes between 100 and 300 nm. The product also exhibited a high specific surface area (Brunauer-Emmett-Teller (BET) surface area of 390 $m^2/g$), which results among other things in a catalytic activity that is dramatically increased as a function of the application area.

The starting product obtained this way can be used for a broad range of applications, of which some are described in the following.

A biological examination of copper hydroxide prepared pursuant the invented method was performed as described above with regard to its fungicidal effectiveness on grapevine cultures (against *peronospora*) and potatoes (against *phytophthora*). It was also shown that, for compositions according to the present inventions, applications comprising between 4% and 10% of the quantity of the corresponding prior art copper hydroxide compositions, were sufficient to achieve the same effectiveness.

Similarly, an examination of the treatment of dry wood revealed that during the immersion of untreated dry wood in a conventional copper hydroxide suspension, the copper hydroxide was fixated only superficially; the measured penetration depth was less than one millimeter. During the immersion of equivalent wood into the copper hydroxide micro-emulsion prepared pursuant to the invention, the copper hydroxide was not limited to the surface, but instead penetrated to a depth of more than 10 mm.

The leaching rate of the product produced according to the present invention, when used in a standardized anti-fouling ship paint, differs clearly from the leaching rate of a ship paint with conventionally produced copper salt. While in the test according to ISO 15181-1, the leaching rate for an anti-fouling product comprising conventionally produced copper salt was 2 $mg/m^2/day$, while the leaching rate for an anti-fouling product comprising a copper salt produced according to the present invention was only 0.1 $mg/m^2/day$.

Doping the copper salts prepared according to the present invention with different ionic species can provide additional advantageous properties. For example, it was found that doping 5 wt % zinc into a copper salt composition intended for agricultural applications provided enhanced surface adhesion, as in the case of plants on leaf and fruit surfaces, thereby increasing the duration of the plant-protecting effects and also eliminating the expense and environmental emissions associated with the re-application of prior art compositions that would be required to provide the same level of protection.

Doping the copper salts prepared according to the present invention with 5 wt % phosphate provides a surface blocking effect on the created nanometer scale particles. This surface blockage effect increases the stability of the phosphate doped particles, thereby increasing the resistance to environmental factors that would tend to degrade the particles. This increased stability results in significant increases in the duration of the effectiveness of a single application of a copper salt composition according to the present invention.

Finally, doping copper salts prepared according to the present invention with 5 wt % carbonate produces a composition comprising particles whose ability to adhere to surfaces is greatly reduced, if not completely eliminated. Nano-particles doped in this manner ran completely together on the surface and formed a larger particle in the micrometer range. It is contemplated that nano-particles doped in this manner would be particularly useful in specialty paints.

In order to improve the stability of micro-emulsions prepared pursuant to the invention, basically any block polymers which comprise both a hydrophobic part and a hydrophilic part may be used. The block lengths must be adjusted such that an inverse tenside is created, i.e., a tenside that improves the dispersion of polar components in non-polar dispersion agents. This means that the hydrophobic part dissolves in the dispersion agent and the hydrophilic part interacts with the surface of the starting product.

Examples of such block polymers include poly(ethylene-co-butylene)-b-polyethyleneoxide, poly(propyleneoxide)-b-polyethyleneoxide, and poly(m-alkyl) (meth)acrylate-b-poly(meth)acrylic acid.

The preferred block polymers have a molar mass of about 3000 g and are of sufficient size and composition to remain relatively stable.

In the method pursuant to the invention it is important that the particles are not completely enclosed with tenside and are covered only to a small extent with block polymers. The hydrophilic part of the ten-sides is on the surface of the particles, while the hydrophobic part protrudes into the dispersion agent like a porcupine. This low coverage represents an important advantage in that only low quantities of tenside have to be used. The fact that block polymers, which are biologically not persistent and thus also cannot enter into undesirable reciprocal effects with metals in the ground, can be used for performing the above-described method should be regarded as another benefit.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

We claim:

1. A method for preparing copper salts from a cupriferous reactant and an additional reactant, comprising the steps of:
    preparing a first micro-emulsion of the cupriferous reactant and a first block polymer;
    preparing a second micro-emulsion of the additional reactant and a second block polymer;
    combining the first and second micro-emulsions to form a final micro-emulsion;
    reacting the cupriferous reactant and the additional reactant in the final micro-emulsion to produce a copper salt characterized by a specific surface area of at least 100 $m^2/g$.

2. A method for preparing copper salts according to claim 1, wherein:
    the step of preparing the first micro-emulsion;
    the step of preparing the second micro-emulsion; and
    the step of combining the first and second micro-emulsion to form the final micro-emulsion, each further comprise applying energy to the micro-emulsions from a means selected from the group consisting of an ultrasonic agitator and a high-pressure homogenizer.

3. A method for preparing copper salts according to claim 1, wherein:
the first block polymer and the second block polymer are substantially identical block polymers.

4. A method for preparing copper salts according to claim 1, further comprising the step of:
reacting the copper salt with a strong base to produce an alkaline copper compound.

5. A method for preparing copper salts according to claim 4, wherein:
the copper salt is selected from the group of copper salts consisting of copper chloride ($CuCl_2$) and copper nitrate ($Cu(NO)_3$) and the strong base is sodium hydroxide (NaOH).

6. A method for preparing copper salts according to claim 5, wherein:
the step of forming the final micro-emulsion further comprises forming an intermediate micro-emulsion comprising a dispersed agglomerate.

7. A method for preparing copper salts according to claim 6, wherein:
the dispersed agglomerate comprises a copper hydroxide/sodium chloride ($Cu(OH)_2/NaCl^-$) agglomerate and
wherein the step of reacting the cupriferous reactant and the additional reactant further comprises the steps of reducing bivalent copper ($Cu^{2+}$) to monovalent copper ($Cu^+$); and
forming copper-(I)-oxide ($Cu_2O$).

8. A method for preparing copper salts according to claim 1, wherein:
at least one of the first and second block polymers comprises at least one material selected from the group consisting of polyethyleneoxide block polymer, poly(ethylene-co-butylene)-b-polyethyleneoxide block polymer, poly(propyleneoxide)-b-polyethyleneoxide block polymer and poly(m-alkyl)(meth)acrylate-b-poly(meth)acrylic acid.

9. A method for preparing copper salts according to claim 1, wherein the step of combining the first and second micro-emulsion to form the final micro-emulsion further comprises the step of:
doping the final micro-emulsion with foreign ions.

10. A method for preparing copper salts according to claim 9, wherein:
the foreign ions comprise at least 5 percent by weight of the final micro-emulsion.

11. A method for preparing copper salts according to claim 9, wherein:
the foreign ions comprise at least one ion selected from the group consisting of zinc ions, phosphate ions and carbonate ions.

* * * * *